United States Patent [19]
Lambiris

[11] 3,800,737
[45] Apr. 2, 1974

[54] SHIFT INDICATOR ARRANGEMENT

[75] Inventor: Theodore Lambiris, Walled Lake, Mich.

[73] Assignee: General Motors Corporation, Detroit, Mich.

[22] Filed: July 30, 1973

[21] Appl. No.: 384,040

[52] U.S. Cl. .......................... 116/124 R, 116/136.5
[51] Int. Cl. ................................................ G09f 9/00
[58] Field of Search ........ 116/124, 129, 115, 136.5, 116/DIG. 6, DIG. 20; 73/337, 337.5, 363.5; 74/10.9, 475, 483, 484

[56] References Cited
UNITED STATES PATENTS

| | | | |
|---|---|---|---|
| 2,737,147 | 3/1956 | Bliss | 116/124 R |
| 2,909,067 | 10/1959 | Karlsruhr | 74/10.9 |
| 2,925,061 | 2/1960 | Thornburgh et al. | 116/124 R |
| 3,015,951 | 1/1962 | Ochs, Jr. | 116/136.5 |
| 3,183,884 | 5/1965 | Daniels | 116/124 R |
| 3,602,187 | 8/1971 | Lambiris | 116/124 R |
| 3,608,377 | 9/1971 | Fenner | 73/337 |
| 3,695,215 | 10/1972 | Lambiris | 116/124 R |
| 3,719,162 | 3/1973 | Herod et al. | 116/124 R |
| 3,739,741 | 6/1973 | Freyermuth | 116/124 R |

Primary Examiner—Louis J. Capozi
Attorney, Agent, or Firm—John P. Moran

[57] ABSTRACT

An improved shift indicator arrangement including a one-piece polypropylene housing and integrally molded pointer mechanism interconnected by a flexible hinge, the combination having provisions formed thereon suitable for the connection thereto of a steering column shift tube-actuated cable such that the extent of resultant travel of the pointer mechanism is one-half that of the linearly movable cable in order that a smaller, more practicable indicator gage or scale may be used.

4 Claims, 6 Drawing Figures

SHIFT INDICATOR ARRANGEMENT

This invention relates generally to shift indicator mechanisms and, more particularly, to such mechanisms adaptable for mounting on the instrument panel of a vehicle.

An object of the invention is to provide an improved, simplified, economical, and readily manufactured and assembled shift indicator housing and integrally molded pivotable pointer mechanism.

Another object of the invention is to provide an improved shift indicator mechanism wherein the housing is a molded one-piece polypropylene housing having a pointer mechanism interconnected thereon by an integrally molded flexible hinge.

A further object of the invention is to provide such a shift indicator mechanism wherein the housing and pointer mechanism have provisions formed thereon suitable for the connection thereto of a steering column shift tube-actuated cable such that the extent of resultant travel of the pointer mechanism is one-half that of the linearly movable cable in order that a smaller, more practicable indicator gage or scale may be used.

These and other objects and advantages of the invention will be apparent when reference is made to the following description and accompanying drawings, wherein.

Figure 1:
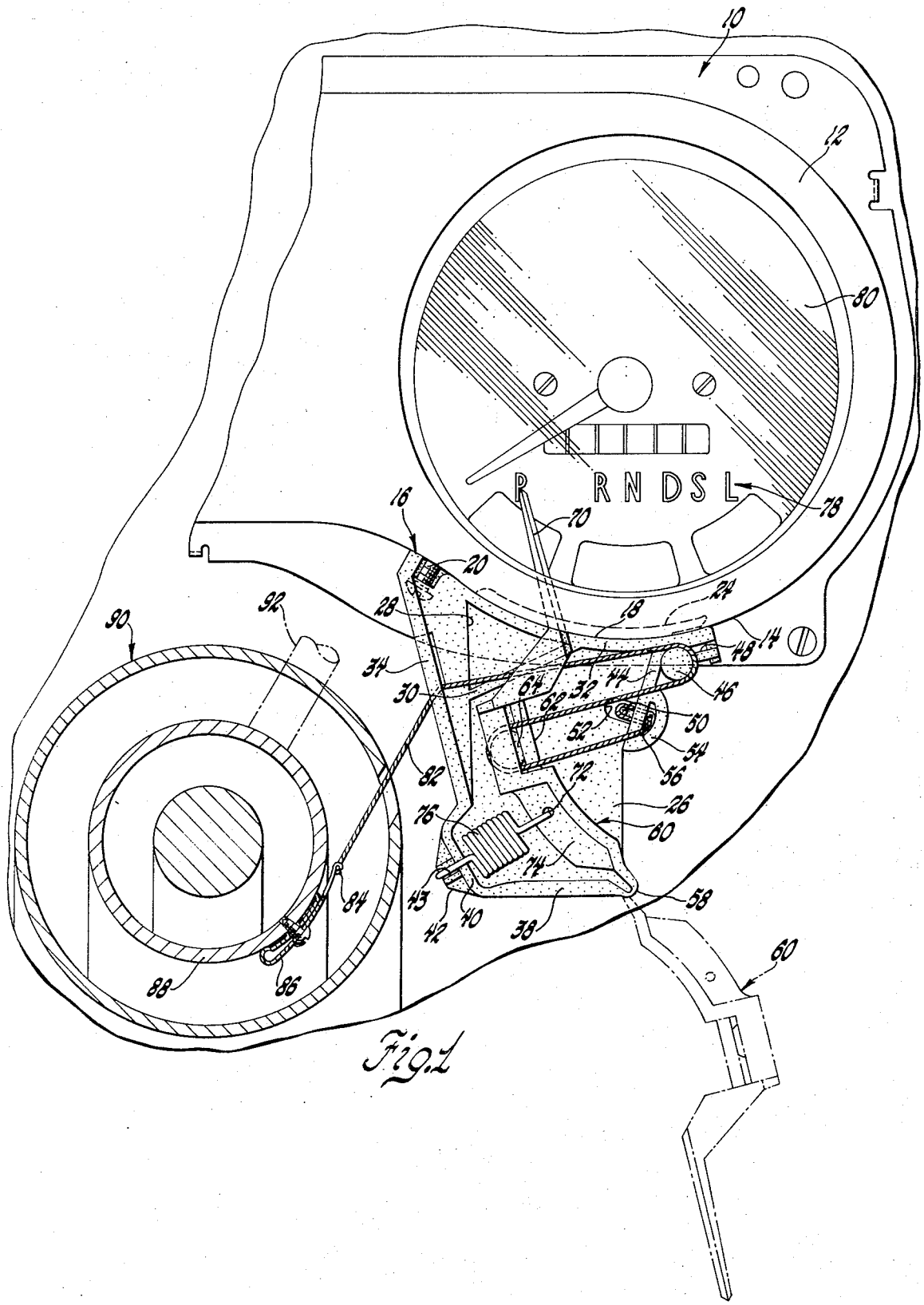
FIG. 1 is a fragmentary frontal view of a vehicular instrument panel embodying the invention.
Figure 2:
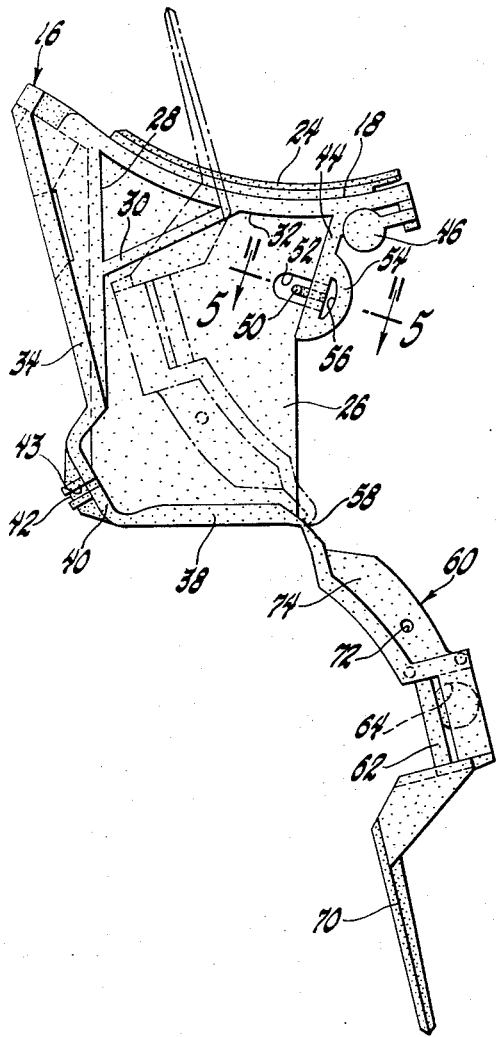
FIG. 2 is a front view of a shift indicator assembly adaptable for embodying the invention.
Figure 5:
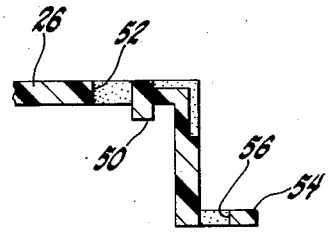
FIG. 5 is a fragmentary cross-sectional view taken along the plane of line 5—5 of FIG. 2 and looking in the direction of the arrows.
Figures 3, 4:
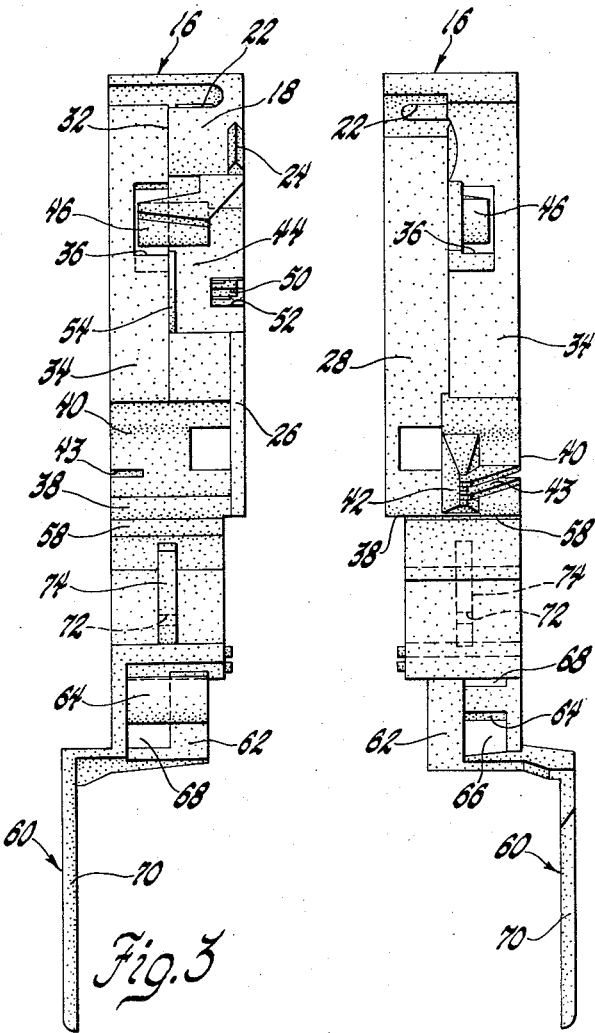
FIGS. 3 and 4 are opposite end views of the FIG. 2 structure.

Referring now to the drawings in greater detail, FIG. 1 illustrates a vehicular instrument panel 10 including a speedometer dial housing 12 having an arcuate-shaped outer surface 14 to which a shift indicator housing 16 is secured at an upper arcuate-shaped surface 18 thereof by a single fastener, such as a screw 20, mounted through an opening 22 (FIG. 4) formed adjacent one end of the upper arcuate-shaped surface 18. A narrow vertical flange portion 24 (FIG. 2) is formed on an edge of the upper arcuate-shaped surface 18 for abutting against a face of the speedometer dial housing 12 for proper alignment therewith of the shift indicator housing 16.

The housing 16 further includes a back wall 26 having a left side wall 28 integrally molded thereon and maintained rigid by virtue of a brace 30 integrally molded across the back wall 26, between the side wall 28 and the wall 32 of the upper arcuate-shaped surface 18. A side wall extension 34 is formed on the outer edge of the side wall 28 at a predetermined angle therewith. A cable opening 36 (FIG. 4) is formed through the side wall extension 34. A bottom wall 38 is integrally molded along the lower edge of the back wall 26, the bottom wall 38 having a width equal to the total width of the side wall 28 and side wall extension 34. An intermediate wall portion 40 is integrally molded along the lower portion of the side wall 28, interconnecting adjacent ends of the bottom wall 38 with the side wall extension 34. A spring retainer projection 42 and an adjacent slot 43 are formed on the intermediate wall portion 40.

Figure 6:
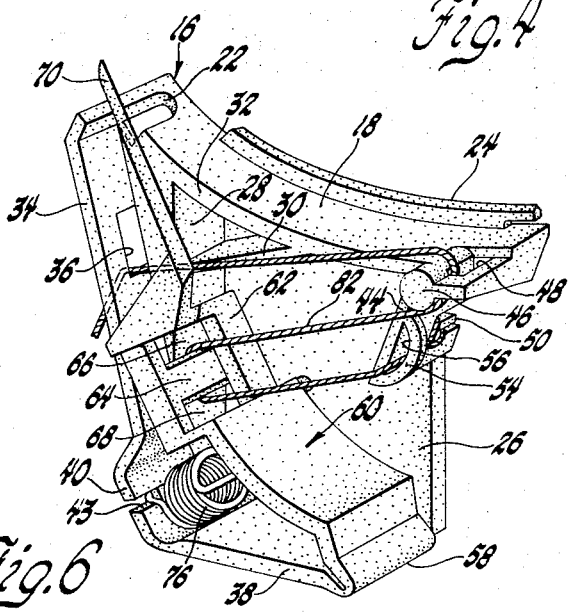
FIG. 6 is a perspective view of a shift indicator assembly embodying the invention.

An abutment or stop member 44 is integrally molded along the upper right-hand edge of the back wall 26, interconnected to the wall 32 of the upper arcuate-shaped surface 18 adjacent the end thereof opposite the fastener opening 22. A post 46 is formed on the abutment member 44 adjacent the upper edge thereof. A cable opening 48 (FIG. 6) is formed in the upper wall 32 adjacent the post 46. A cable-retainer projection 50 is formed on the abutment member 44, extending into an access opening 52 formed in the back wall 26. An arcuate bridge 54 is formed on the outer surface of the abutment member 44, forming a cable opening 56 therewith.

A flexible hinge 58 is integrally molded adjacent the right-hand edge of the bottom wall 38, interconnecting the latter to a pointer mechanism body 60. A stop surface 62 is formed on the pointer mechanism body 60. A post 64 (FIG. 6) is formed adjacent the stop surface 62. A pair of openings 66 and 68 are formed adjacent opposite sides of the post 64. A pointer member 70 is formed on the free end of the pointer mechanism body 60, extending outwardly therefrom. An opening 72 is formed in a flange portion 74 formed vertically along the pointer mechanism body 60 intermediate the post 64 and the flexible hinge 58. A coil spring 76 is mounted parallel to the back wall 26 within the confines of the bottom wall 38 and the side wall extension 34, between the opening 72 in the flange portion 74 and the spring retainer projection 42 and adjacent slot 43 of the intermediate wall portion 40. The coil spring 76 causes the pointer member 70 to assume an upwardly extended position within the speedometer dial housing 12 for cooperation with transmission gear ratio indicia 78 (FIG. 1), namely P-R-N-D-S-L, formed on the window 80 of the speedometer dial housing 12.

A cable 82 is secured at one end thereof to the cable-retainer projection 50 (FIG. 6), extending therefrom through the opening 56 formed by the arcuate bridge 54, and thence out through the opening 68, around the post 64 and back through the opening 66 of the pointer mechanism body 60, around the post 46 and through the cable opening 48, back across the housing 16 and out through the cable opening 36 formed in the side wall extension 34, and thence downwardly therefrom to a crimped end portion 84 (FIG. 1) of a connector member 86 secured to the shift tube 88 of a conventional steering column assembly 90. The shift tube 88 is, of course, rotatable in response to manual rotary movement of a conventional transmission selector lever 92.

OPERATION

In operation, clockwise rotation (FIG. 1) of the shift tube 88 in response to manual movement of the selector lever 92 pulls on the double, reversely-looped cable 82, causing the pointer mechanism body 60 and, hence, the pointer member 70, to move in a clockwise direction against the force of the coil spring 76, about the flexible hinge 58. Similarly, counterclockwise rotation of the shift tube 88 causes a slackening of the cable 82, allowing the coil spring 76 to move the pointer member 70 in a counterclockwise direction. Thus, the pointer member 70 is moved across the window 80 of the speedometer dial housing 12 to a position adjacent one of the P-R-N-D-S-L- indicia 78 to indicate the selected gear ratio setting of the transmission.

It should be noted that the reversely-looped configuration of the cable 82 about the post 46 and 64 of the pointer mechanism body 60 results in the travel of the pointer member 70 being one-half that of the linear displacement of the cable 82.

It should also be apparent that the invention provides an improved integrally molded one-piece shift indicator housing and pivotable pointer mechanism.

While but one embodiment of the invention has been shown and described, other modifications thereof are possible.

I claim:

1. A shift indicator mechanism adaptable for mounting on the instrument panel of a vehicle and responsive to the rotary movement of a shift tube, said shift indicator mechanism comprising a housing, said housing including integrally molded back, upper, bottom and side walls, a slotted spring retainer opening formed at the lower end of said side wall, a first post formed adjacent an end of said upper wall, cable-retainer means formed on said back wall, a pointer mechanism body, a flexible hinge interconnecting one end of said pointer mechanism body and the other end of said bottom wall, a pointer member formed on the other end of said pointer mechanism body, a coil spring mounted between said pointer mechanism body and said side wall for pivoting said pointer mechanism body about said flexible hinge and into contact with said side wall, a first cable opening formed in said side wall at an intermediate point therealong, a second cable opening formed in said upper wall adjacent said first post, third and fourth cable openings formed in said pointer mechanism body, a second post formed in said pointer mechanism body intermediate said third and fourth cable openings, means formed on said back wall forming a fifth cable opening therewith adjacent said cable-retainer means, and a cable connected at one end thereof to said shift tube and extending through said first cable opening, around said first post and through said second cable opening, and thence through said third cable opening, around said second post and through said fourth cable opening, thence through said fifth cable opening to said cable-retainer means.

2. A shift indicator mechanism adaptable for mounting on the instrument panel of a vehicle and responsive to the rotary movement of a shift tube, said shift indicator mechanism comprising a housing, said housing including integrally molded back, upper, bottom, and side walls, a slotted spring retainer opening formed at the lower end of said side wall, an abutment member formed along the upper portion of an edge of said back wall and along an end portion of said upper wall, a first post formed on the juncture of said abutment member and said upper wall, cable-retainer means formed on said abutment member and extending into an opening formed in said back wall, a pointer mechanism body, a flexible hinge interconnecting one end of said pointer mechanism body and an end of said bottom wall, a pointer member formed on the other end of said pointer mechanism body, a stop portion formed on said pointer mechanism body, a spring retainer opening formed in said pointer mechanism body, a coil spring mounted between said latter retainer opening for urging said stop portion away from said abutment member, pivotable at said flexible hinge, and into contact with said side wall, a first cable opening formed in said side wall at an intermediate point therealong, a second cable opening formed in said upper wall adjacent said first post, third and fourth cable openings formed in said pointer mechanism body, a second post formed in said pointer mechanism body intermediate said third and fourth cable openings, means formed on said abutment member forming a fifth cable opening therewith, and a cable connected at one end thereof to said shift tube and extending through said first cable opening, around said first post and through said second cable opening, and thence through said third cable opening, around said second post and through said fourth cable opening, hence through said fifth cable opening to said cable-retainer means.

3. A shift indicator mechanism adaptable for mounting on the instrument panel of a vehicle and responsive to the rotary movement of a shift tube, said shift indicator mechanism comprising a housing, said housing including a main back wall, an upper mounting wall integrally formed along the upper edge of said main back wall, a bottom wall integrally formed along the lower edge of said main back wall, a side wall integrally formed along one vertical edge of said main back wall, a side wall extension formed along the upper portion of an outer edge of said side wall at a predetermined angle therewith, a connector wall portion integrally formed on the lower portion of the outer edge of said side wall intermediate the adjacent ends of said side wall extension and said bottom wall, a sloteed spring retainer opening formed in said connector wall portion, an abutment member formed along the upper portion of the other vertical edge of said main back wall and along an end portion of said upper mounting wall, a first post formed at the juncture of said abutment member and said upper mounting wall, a cable-retainer projection formed on said abutment member and extending into an opening formed in said main back wall, a pointer mechanism body, a flexible hinge interconnecting one end of said pointer mechanism body and the other end of said bottom wall, a pointer member formed on the other end of said pointer mechanism body, a stop portion formed on said pointer mechanism body, a spring retainer opening formed in said pointer mechanism body, a coil spring mounted between said latter spring retainer opening and said slotted spring retainer opening for urging said stop portion away from said abutment member, pivotable at said flexible hinge, and into contact with said side wall, a first cable opening formed in said side wall extension at an intermediate point therealong, a second cable opening formed in said upper mounting wall adjacent said first post, third and fourth cable openings formed in said pointer mechanism body, a second post formed in said pointer mechanism body intermediate said third and fourth cable openings, an arcuate bridge formed on said abutment member forming a fifth cable opening therewith, and a cable connected at one end thereof to said shift tube and extending through said first cable opening, around said first post and through said second cable opening, and thence through said third cable opening, around said second post and through said fourth cable opening, thence through said fifth cable opening to said cable-retainer projection.

4. A shift indicator mechanism adaptable for mounting on the instrument panel of a vehicle and responsive to the rotary movement of a shift tube, said shift indicator mechanism comprising a housing, said housing including a main back wall, an upper arcuate-shaped mounting wall integrally formed along the upper edge of said main back wall, a fastener opening formed adjacent one end of said upper mounting eall, a bottom wall integrally formed along the lower edge of said main back wall, a side wall integrally formed along the left edge of said main back wall, a side wall extension formed along the upper portion of an outer edge of said side wall at a predetermined angle therewith, a connector wall portion integrally formed on the lower portion of said outer edge of said side wall intermediate the adjacent ends of said side wall extension and said bottom wall, a slotted spring retainer opening formed in said connector wall portion, an abutment member formed along the upper portion of the other outer edge of said main back wall and along the other end portion of said upper arcuate-shaped mounting wall, a first post formed at the juncture of said abutment member and said upper arcuate-shaped mounting wall, a cable-retainer projection formed on said abutment member and extending into an opening formed in said main back wall, a pointer mechanism body, a flexible hinge interconnecting one end of said pointer mechanism body and the other end of said bottom wall, a pointer member formed on the other end of said pointer mechanism body, a stop portion formed on said pointer mechanism body, a longitudinal flange portion formed on said pointer mechanism body, a spring retainer opening formed in said longitudinal flange portion, a coil spring mounted between said spring retainer opening in said flange portion and said slotted spring retainer opening in said connector wall portion for urging said stop portion away from said abutment member, pivotable at said flexible hinge, and into contact with said side wall, a first cable opening formed in said side wall extension at an intermediate point therealong, a second cable opening formed in said upper arcuate-shaped mounting wall adjacent said first post, third and fourth cable openings formed in said pointer mechanism body, a second post formed in said pointer mechanism body intermediate said third and fourth cable openings, an arcuate bridge formed on said abutment member forming a fifth cable opening therewith, and a cable connected at one end thereof to said shift tube and extending through said first cable opening, around said first post and through said second cable opening, and thence through said third cable opening, around said second post and through said fourth cable opening, thence through said fifth cable opening to said cable-retainer projection.

\* \* \* \* \*